US006252982B1

(12) United States Patent
Haisma et al.

(10) Patent No.: US 6,252,982 B1
(45) Date of Patent: Jun. 26, 2001

(54) IMAGE PROCESSING SYSTEM FOR HANDLING DEPTH INFORMATION

(75) Inventors: Jan Haisma; Franciscus P. Widdershoven; Marnix G. Collet, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 892 days.

(21) Appl. No.: 08/511,507

(22) Filed: Aug. 4, 1995

(30) Foreign Application Priority Data

Aug. 8, 1994 (EP) .................................................. 94202272

(51) Int. Cl.[7] ...................................................... G06K 9/00
(52) U.S. Cl. ........................... 382/154; 345/422; 382/285
(58) Field of Search .................................... 382/154, 285, 382/106–107, 218, 255; 395/122; 348/585, 419, 420, 422, 425

(56) References Cited

U.S. PATENT DOCUMENTS

| | | | | |
|---|---|---|---|---|
| 4,661,986 | * | 4/1987 | Adelson ................................. | 382/154 |
| 4,991,224 | * | 2/1991 | Takahashi et al. .................... | 382/154 |
| 5,113,213 | * | 5/1992 | Sandor et al. ......................... | 355/22 |
| 5,247,590 | * | 9/1993 | Fukuhara et al. ..................... | 382/285 |
| 5,295,199 | * | 3/1994 | Shino ..................................... | 382/154 |
| 5,309,522 | * | 5/1994 | Dye ........................................ | 382/154 |
| 5,363,475 | * | 11/1994 | Baker et al. .......................... | 395/122 |
| 5,408,272 | * | 4/1995 | Barnett et al. ........................ | 395/122 |

OTHER PUBLICATIONS

"Naked Eyes Catch 3D on TV", by Peter Hadfield, Tokyo, New Scientist, Nov. 13, 1993, p. 23.
"Secrets of 3D TV Without Specs", by Leigh Dayton, Sydney, New Scientist, Feb. 19, 1994, p. 19.
"Into the Third Dimension", by Graeme O'Neill, Time, Oct. 18, 1993, pp. 64–65.
"On the Brink of a Revolution in 3–D" by Adele Ferguson, Business Review Weekly, Feb. 7, 1994, pp. 44 and 48.

* cited by examiner

Primary Examiner—Jay Patel
(74) Attorney, Agent, or Firm—Peter Verdonk

(57) ABSTRACT

An image processing system creates a 2-dimensional output image with enhanced depth sensation by operating on a 2-dimensional input image. The system processes the input image non-uniformly by selecting an area in the input image according to a predetermined criterion, and changing a property, e.g., its brightness, of the area relative to a corresponding property of a complement of the area in the input image.

10 Claims, 2 Drawing Sheets

IMAGE PROCESSING SYSTEM FOR HANDLING DEPTH INFORMATION

BACKGROUND OF THE INVENTION

1. Field of the Invention

The invention relates to a method and to an image processing system for processing a 2-dimensional input image to create a 2-dimensional output image with enhanced depth sensation.

2. Background Art

A particular problem pursued in the field of image processing is electronic image enhancement to give the viewer the impression of a 3-dimensional (3D) scene when watching an image on a 2-dimensional (2D) display. With the advent of virtual reality, the search for a solution to represent or suggest depth in electronically generated visual 2D information has gained momentum.

A known way to provide depth sensation is based on stereopsis, i.e., stereoscopic vision. Stereopsis is evoked by two images of the same scene as perceived from two positions a little way apart. One of the images is observed by the left-hand eye, the other one is observed simultaneously by the right-hand eye. Discrimination between the left-hand and right-hand images is brought about by auxiliary viewing devices, for example, spectacles with left-hand transmission properties different from the right-hand ones.

Alternatively, the brain can reconstruct 3D-images when the right and left fields of vision are presented in rapid succession. To this end, a series of alternatingly clear and opaque strips are made to oscillate so fast that an image on a screen behind the oscillating strips appears clear. A special camera records the two alternating images. As the slits and the strips lock together and scan quickly across the screen both images are assembled by the brain of the observer to form a single 3D image. Under ideal circumstances, the 3D effect is independent of the distance between the observer and the screen. See, e.g., New Scientist, Feb. 1994, page 19; Time, Oct. 18, 1993, pp. 64–65, or Business Review Weekly, Feb. 7, 1994, pp. 44 and 48. This approach requires that the right-hand and left-hand information fields of vision be separately available and also needs a dedicated presentation system.

Another manner to perceive depth in 2D images is based on so-called Single Image Random Dots Stereopsis, also referred to as autostereopsis, i.e., adaption of the convergence of the eyes to a pair of two superimposed stereoscopic images. Two superposed stereoscopic images give the sensation of depth by skew-eyed watching, as convergence and accommodation of the eyes are decoupled. This is difficult to learn, and once learned it is experienced as fatiguing on the long run.

OBJECT OF THE INVENTION

It is an object of the invention to provide an alternative system for the creation of images that give 3D sensation based on the processing of 2D image data. It is another object to provide a system that is able to operate on conventional 2D images, such as TV pictures.

SUMMARY OF THE INVENTION

To this end, the invention provides a system as specified in the preamble, characterized by an identificator operative to select, according to a predetermined criterion, at least one area being a portion of the input image; and a processor operative to create the output image by changing a property of the area relative to a corresponding property of a complement of the area in the input image. The depth enhancement can be achieved through, e.g., selectively processing the area, or its complement or complementarily processing both the area and its complement. The processor is operative to modify, e.g., contrast, hue, brightness or sharpness.

The invention is based on the insight that in essence human vision is spatially non-uniform, and that depth sensation can be made more pronounced by treating the input image non-uniformly. For instance, a person looking straight at an object perceives that object as being clearer, sharper, or more pronounced than other objects lying at the same distance from that person but whose images occur in the periphery of the person's field of vision. The system underlying human vision differs from artificial image-processing systems. A camera, for example, does not discriminate between objects that lie substantially on the camera's optical axis and objects that do not. Actually, the camera's designer will do everything to eliminate such non-uniformities, that derive from spherical aberration, from the mapping of the image onto the film. The invention therefore advocates an approach for artificial image-processing essentially different from that used heretofore.

For example, by enhancing the contrast in the area of the main object shown by the input image relative to its surroundings, depth is felt to be more strongly present. Similarly, brightness and/or hue can thus be used to augment depth sensation. Also, the area's complement can be treated by reducing contrast, brightness or hue to stress the content of the area itself. Alternatively, selective filtering out of higher-frequency components from the area's complement increases the area's sharpness and contributes to the area being presented as more pronounced. Other quantities may be used, or combinations of aforesaid quantities, as depth cues in order to non-uniformly process the input image.

Alternatively, or supplementarily, the information content of the scene represented by the input image is identified on the basis of, e.g., the contours of an object, distribution of colours, luminance and polarization, coherence in case of movement, etc. The information contents may be used to select the area for processing as specified above. In a further alternative embodiment, the area may be identified on the basis of object recognition.

The invention is inspired by developments in the art of painting, wherein new techniques (e.g., the use of perspective, pointillism) and novel manners of expression (e.g., pop-art, or non-figurative art) each time have taught fresh ways of perception, that have been accepted by the audience only gradually. According to the invention, particular characteristics of the 2D image, called the monocular depth cues, are modified so as to control depth sensation. In order to appreciate the accomplishment of depth generation, the spectator may have to learn anew how to look at the novel depth-enhanced 2D images generated by the system of the invention.

Preferably, the system in the invention is suitable for handling moving pictures on a real-time basis. Preferably, the processor is user-controllable to individualize or customize the representation of the output image. For example, a conventional TV set can be provided with a system in accordance with the invention. A user may then adapt a TV broadcasting to his personal liking.

Note that the invention provides advantages not only in the consumer field, such as video entertainment, but also in the field of professional image analysis and processing, such as in medical applications (NMR, X-ray scan), in photographic art, and computer aided design. The invention also may find a use in multi-media systems that are designed to combine in a compound image, under user-control, information items obtainable from a large variety of information sources, so that the depth sensation of the compound image can be freely manipulated.

The invention also relates to a method of processing a 2-dimensional input image to create a 2-dimensional output image with enhanced depth sensation, characterized by selecting, according to a predetermined criterion, at least one area being a portion of the input image, and changing a property of the area relative to a corresponding property of a complement of the area in the input image. At least contrast, hue, brightness or sharpness the input image can thus be changed non-uniformly. Digital signal processors of a general-purpose type can be used to implement the method of the invention.

BRIEF DESCRIPTION OF THE DRAWING

The invention is explained below in further detail by way of example and with reference to the accompanying drawing wherein.

Throughout the drawing, same reference numerals indicate similar or corresponding parts.

DETAILED DESCRIPTION OF THE PREFERRED EMBODIMENTS

Figure 1:
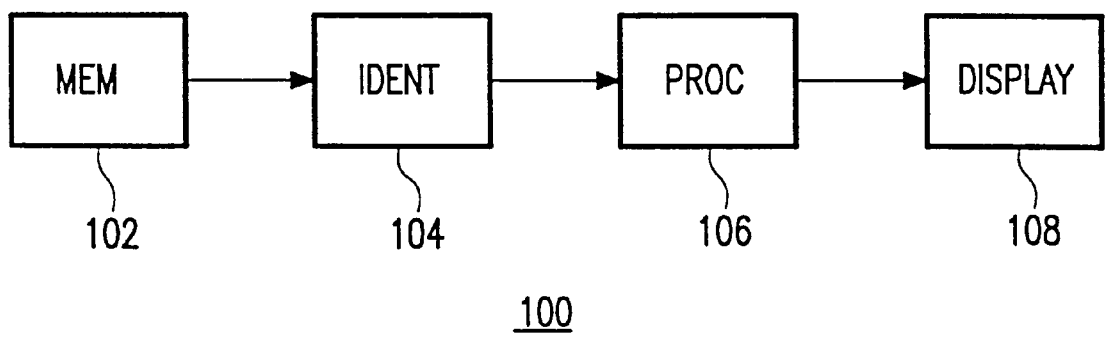
FIG. 1 is a block diagram of an embodiment of the system of the invention.

FIG. 1 is a block diagram of functionalities in a system 100 according to the invention. System 100 creates a 2-dimensional output image with enhanced depth sensation by operating on a 2-dimensional input image. System 100 comprises a memory 102 for storage of an input image as an array of pixels. System 100 further includes an identificator 104 coupled to memory 102 and operative to identify an area in the input image that is substantially in-focus. That is, the area identified in this example, is the portion of the input image whose sharpness of outline is the greatest. System 100 also incorporates a processor 106 operative to create the output image by augmenting the depth sensation of the area relative to its complement. A display 108 eventually displays the output image thus obtained.

Although identificator 104 and processor 106 are drawn as separate blocks, it is clear to the person skilled in the art that parts 104 and 106 can functionally and physically be integrated with one another, e.g., in a microprocessor. Further, parts 104 and 106 can be implemented fully or partially by software. Also, display 108, e.g., an LCD, can be used as memory 102, since the information content of the LCD itself can be made available for being processed again and for thereupon being fed back to the LCD again. Operation of the system is explained below with reference to the example images of FIGS. 2 and 3.

Figure 2:
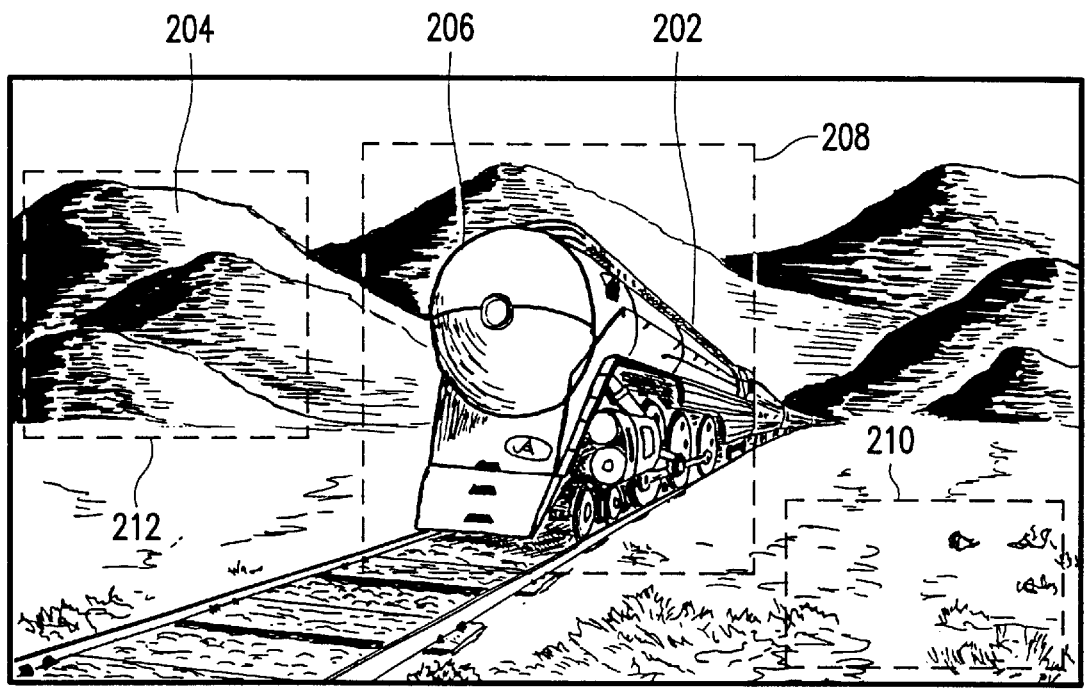
FIGS. 2 and 3 give examples of an input image and an output image.

FIG. 2 gives an example of an input image 200 for being processed by system 100. Input image 200 is a picture of a 3D scene of a train 202 in a landscape with a mountain ridge 204 at the horizon. The camera that took the picture focused on the front 206 of the engine. Accordingly, an area 208 of input image 200 draws attention due to its being in the center and within the range of the camera's depth of field, thereby enabling the spectator to discern an abundance of details. Upon looking at the picture, areas 210 and 212 are subconsciously interpreted as subordinate to area 208, since objects are pictured as being more fuzzy or hazy due to their being farther away from or closer to the plane defining the camera's depth of field.

System 100 operates as follows. First, area 208 of input image 200 is identified by system 100. This could be achieved in a variety of ways. For example, a picture typically tends to be centered on what the photographer considered the main object at the time the picture was taken. Therefore, system 100 could consider a center section of the input image and identify it as the area 208 that is in-focus. Alternatively, the in-focus region of a picture usually has the highest resolution. That is, the in-focus region contains the highest frequencies. System 100 therefore could detect and locate the presence of high frequencies in a particular section, here center area 208.

Upon center area 208 being detected, input image 200 is non-uniformly processed. For example, the brightness of center area 208 is augmented relative to the other areas of input image 200. Alternatively, or supplementarily, the contrast and/or the hue of center area 208 is increased relative to that of the surrounding sections in input image 200.

Figure 3:
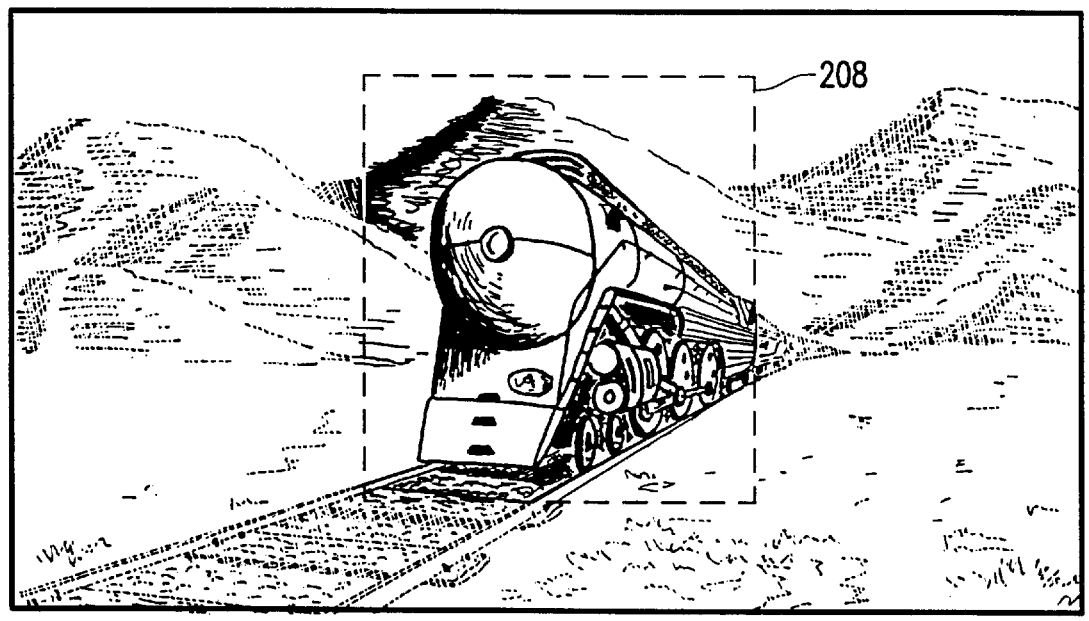

FIG. 3 gives a first example of an output image 300, it being the result of system 100 operating on input image 200 by varying the contrast non-uniformly. The contrast of area 208 in input image 200 is increased, whereas the contrast of the remainder of input image 200 is lowered. As a result, the engine being in area 208 is presented in a more pronounced manner with respect to its surroundings, thereby augmenting depth sensation. Alternatively, the contrast may be reduced in the area surrounding center area 208 to obtain a similar result.

In an alternative embodiment, an input image may be accompanied by independently available depth information. For example, assume the input image to be represented as an array of pixels. Each individual one of the pixels belongs to a particular object or to a portion of the object shown in the picture. For each pixel then it is indicated how far away from the camera the associated object or the portion of the associated object is located, or, in other words, its depth. This depth information is obtained in advance, for instance through remote sensing. This depth information then can be used to process the input image non-uniformity as specified above.

Figure 4:
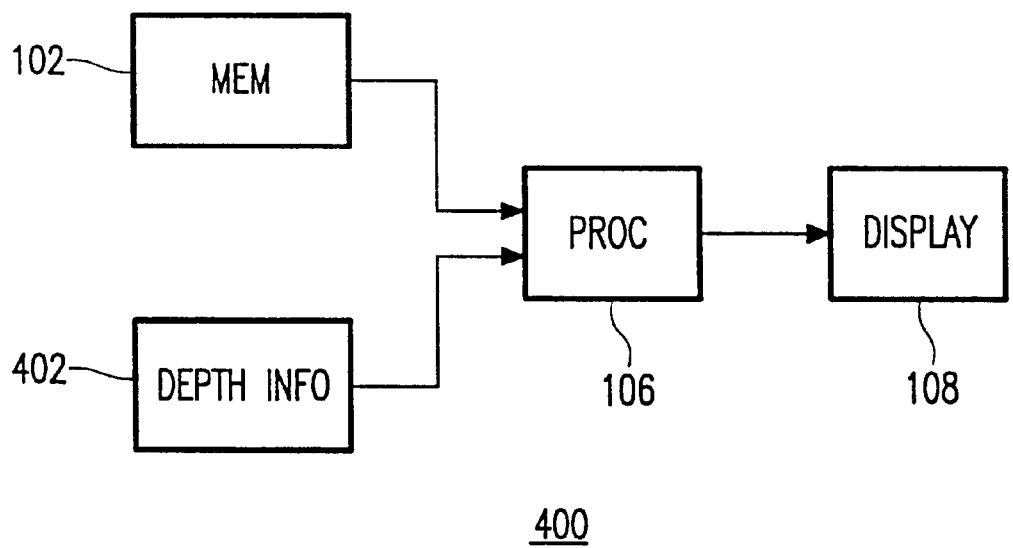
FIG. 4 is a block diagram of another embodiment of the system of the invention.

FIG. 4 shows a system 400 according to the invention for handling such a pre-treated input image. The input image is stored in memory 102 and the corresponding dept information is stored in memory 402. Both memories 102 and 402 supply their content to processor 106 to modify the image as explained with reference to FIGS. 2 and 3, now under control of the specific depth information. This additional dept information indicates for each pixel, for instance, a particular one of a plurality of successive ranges that together make up a distance scale from, say, zero to infinity. Alternatively, each pixel may be accompanied by its real depth value, specified to a certain accuracy.

What is claimed is:

1. An image processing system for processing a 2-dimensional input image to create a 2-dimensional output image with enhanced depth sensation; characterized:

an identificator operative to select, according to a predetermined criterion, at least one area being a portion of the input image;

a processor operative to create the cutout image by changing a property of the area relative to a corresponding property of a complement of the area in the input image, wherein the output image is geometrically substantially undistorted with regard to the input image.

2. The system of claim 1, wherein the processor is operative to selectively process the area, or its complement or is operative to complementarily process both.

3. The system of claim 2, wherein the processor is operative to non-uniformly modify at least one of following properties of the input image: contrast; hue; brightness; sharpness.

4. The system of claim 2, wherein the identificator is operative to select the area on the basis of at least one of following criteria:

the area being substantially in-focus;

the area being at a particular location in the input image;

object-recognition.

5. The system of claim 1, wherein the processor is operative to non-uniformly modify at least one of following properties of the input image: contrast; hue; brightness; sharpness.

6. The system of claim 1, wherein the identificator is operative to select the area on the basis of at least one of following criteria:

the area being substantially in-focus;

the area being at a particular location in the input image;

object-recognition.

7. A method of processing a 2-dimensional input image to create a 2-dimensional output image with enhanced depth sensation; characterized by selecting, according to a predetermined criterion, at least one area being a portion of the input image;

changing a property of the area relative to a corresponding property of a complement of the area in the input image.

8. The method of claim 7, wherein at least one of the following properties of the input image is non-uniformly changed: contrast; hue; brightness; sharpness.

9. The method of claim 8, wherein the selection of the area is done on the basis of at least one of following criteria:

the area being substantially in-focus;

the area being at a particular location in the input image;

object-recognition.

10. The method of claim 7, wherein the selection of the area is done on the basis of at least one of following criteria:

the area being substantially in-focus;

the area being at a particular location in the input image;

object-recognition.

* * * * *